United States Patent [19]

Hirata et al.

[11] 3,915,788

[45] Oct. 28, 1975

[54] TIRE BEAD RING SUPPLYING APPARATUS

[75] Inventors: Yoshiaki Hirata; Yoshiaki Katagiri, both of Kodaira; Shunichi Nomura, Higashimurayama, all of Japan

[73] Assignee: Bridgestone Tire Company Ltd., Kyobashi, Japan

[22] Filed: Nov. 5, 1973

[21] Appl. No.: 412,723

[30] Foreign Application Priority Data
Nov. 9, 1972 Japan............................ 47-112287

[52] U.S. Cl. ................ 156/403; 156/126; 156/131; 156/414; 156/417
[51] Int. Cl.² .................. B29H 17/12; B29H 17/22
[58] Field of Search.... 156/110, 123, 126, 131–136, 156/193, 394, 398, 403, 405, 406, 414, 415, 419, 422, 460

[56] References Cited
UNITED STATES PATENTS

| | | | |
|---|---|---|---|
| 2,998,049 | 8/1961 | Winslow............... | 156/403 |
| 3,257,255 | 6/1966 | Batten................ | 156/403 |

FOREIGN PATENTS OR APPLICATIONS

| | | | |
|---|---|---|---|
| 23,412 | 8/1970 | Japan.................... | 156/398 |
| 1,200,520 | 9/1965 | Germany............... | 156/403 |

Primary Examiner—Douglas J. Drummond
Assistant Examiner—John E. Kittle
Attorney, Agent, or Firm—Waters, Schwartz & Nissen

[57] ABSTRACT

Herein disclosed is a tire bead ring supplying apparatus which is characterized by a bead ring stock drum on which a plurality of bead rings are to be mounted, at least one slide ring slidably coupled with the bead ring stock drum, a slide ring actuator for sliding the slide ring on the periphery of the bead ring stock drum so as to push out the bead rings through one end of the bead ring stock drum, a holding mechanism including at least one radially movable member radially movably mounted on the bead ring stock drum, the radially movable member being moved radially outwardly so as to hold one of the bead rings, at least one bead ring receive sleeve member the outer diameter of which is substantially the same as that of the bead ring stock drum, a holding annular member the inner diameter of which is larger than the outer diameter of the bead ring receive sleeve member, the holding annular member carrying thereon the bead ring receive member in coaxial relation with respect to each other, and a holding mechanism including a radially movable member radially movably mounted in the peripheral wall of the holding annular member, the radially movable member being radially inwardly moved so as to hold a bead ring mounted on the bead ring receive sleeve member.

5 Claims, 4 Drawing Figures

TIRE BEAD RING SUPPLYING APPARATUS

The present invention relates in general to the art of pneumatic tire manufacture and in particular is concerned with a tire bead ring supplying apparatus.

In order to build tire casings for use with motor vehicles, the multiple-ply structure of the tire carcass is usually built up on a rotatable building drum of cylindrical shape having rounded marginal shoulders. It is a conventional practice to wrap two or more plies of rubberized fabric about the drum assembly, the fabric being a cord fabric of weftless type.

The fabrics have a width substantially in excess of the length of the drum and hence their edges, since they extend beyond the two sides of the drum, are folded inwardly on the rounded shoulders of the drum radially towards the rotational axis thereof.

After winding the layers of fabric forming the successive plies on the drum, a pair of metallic bead rings covered with unvulcanized rubber are applied to the folded plies at the shoulders of the drum and serve as a means upon which the bead of the tire casing is formed. The marginal portions of the fabric which extend below the bead ring assemblies, after positioning thereof, are then turned radially outwardly, around the bead rings, thus forming a kind of knot which ties the rings to the cylindrical portion of the carcass.

For the sake of timely supply of the bead rings to the rotatable drum, a plurality bead rings formed in a previous process are mounted on a bead stock drum in such a manner as to contact with one another. It is, in this instance, a problem that since the bead rings are covered with unvulcanized rubber as mentioned above, the bead rings adhers to one another thereby to make difficult to successively and separately supply the bead rings to the folded plies on the rotatable building drum.

An improved bead ring supplying apparatus has been therefore developed, which is disclosed in a Japanese Pat. publication No. 23412/1970. This ring supplying apparatus comprises a pair of acute blades arranged to be radially movable in the vicinity of the end of the bead ring stock drum, and an actuating arrangement for radially outwardly move the acute blades in the vicinity of one end of the bead ring stock drum so as to separate adjacent two bead rings from each other. It is, however, still a problem that the bead rings are injured or, in some cases, cut off by the blades when disarrangement of the apparatus occurs and, in this case, the blades are also seriously damaged because the bead rings are made of metallic wires.

It is accordingly a principal object of the present invention to provide a new and improved bead ring supplying apparatus which is free from the above-stated problem.

According to the present invention, it has been found that the above object is achieved by a bead ring supplying apparatus which is characterized by a bead ring stock drum of cylindrical shape on which a plurality of bead rings are to be mounted, at least one slide slidably coupled with the bead ring stock drum, a slide ring actuator connected with the slide ring for sliding the slide ring on the periphery of the bead ring stock drum so as to push out the bead rings through one end of the bead ring stock drum, a first holding mechanism including at least one first radially movable member radially movably mounted on the bead ring stock drum and actuating means connected to the first radially movable member for radially outwardly moving the first radially movable member so as to hold one of the bead rings, at least one bead ring receive sleeve member the outer diameter of which is substantially the same as that of the bead ring stock drum, a holding annular member of the inner diameter of which is larger than the outer diameter of the bead ring receive sleeve member, the holding annular member carrying thereon the bead ring receive sleeve member in coaxial relation with respect to each other, and a second holding mechanism including a second radially movable member radially movably mounted in the peripheral wall of the holding annular member and actuating means connected to the second radially movable member for radially inwardly moving the second radially movable member so as to hold a bead ring mounted on the bead ring receive sleeve member.

For a full understanding of the invention, a detailed description in a preferred form will now be given in connection with the accompanying drawings and the features forming the invention will be specifically pointed out in the claims.

IN THE DRAWINGS

Figure 1:
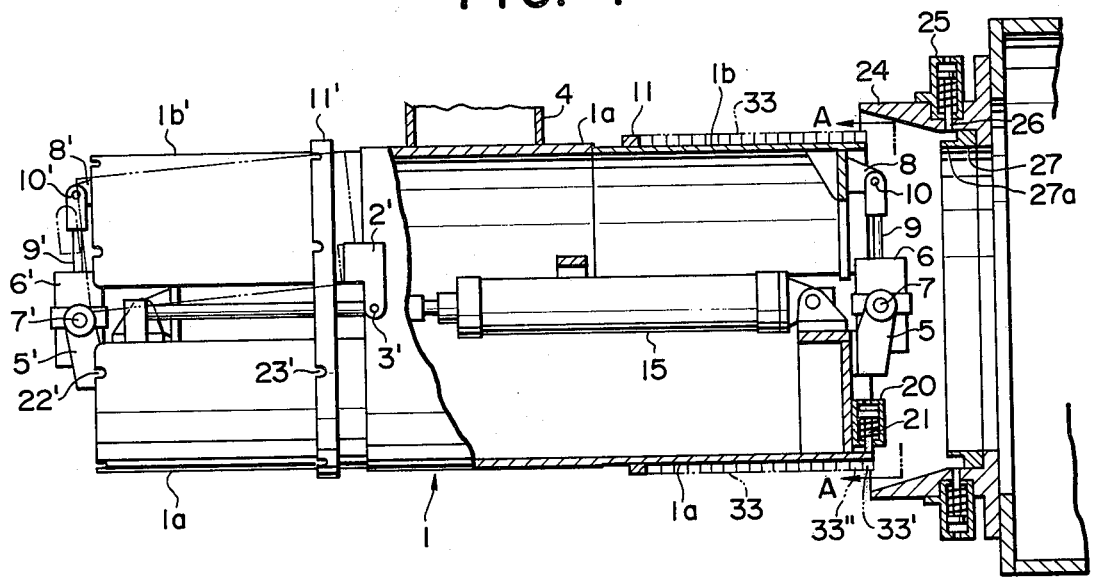
FIG. 1 is a longitudinal sectional view of a bead ring supplying apparatus according to the invention.
Figure 2:
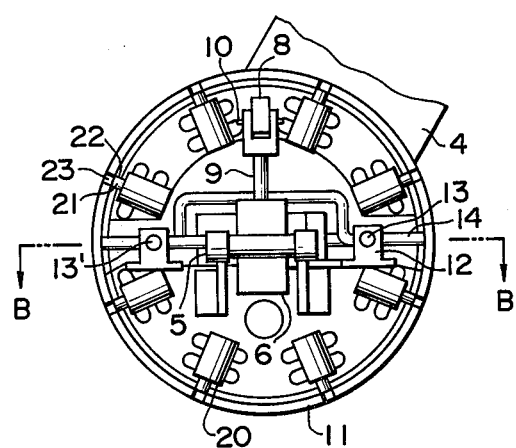
FIG. 2 is a view taken along the line A—A of FIG. 1.
Figure 3:
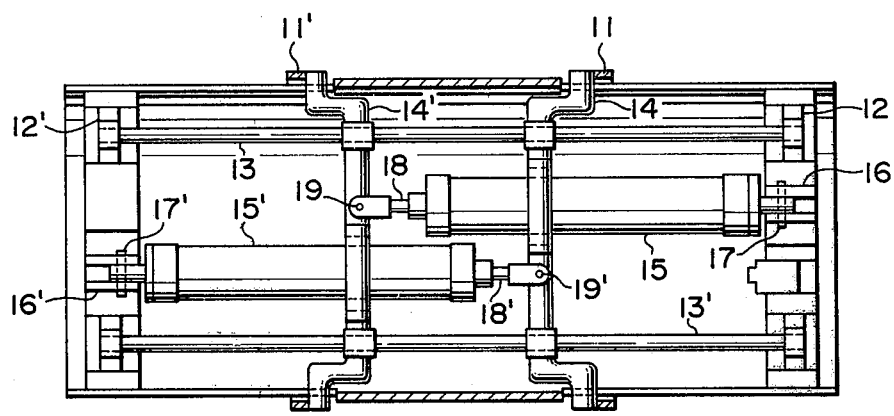
FIG. 3 is a sectional view taken along the line B—B of FIG. 2.

Referring now to the drawings and more specifically to FIGS. 1 through 3 thereof, there is illustrated a bead ring supplying apparatus according to the present invention, which comprises a bead ring stock drum 1 of cylindrical shape. The bead ring stock drum 1 is, in this case, formed symmetric with respect to the central plane and comprised of stationary part 1a and a pair of movable parts 1b and 1b'. The stationary part 1a consists of a central cylindrical first element and a pair of substantially semicylindrical second elements which extend perpendicularly to the lower ends of the central cylindrical first element. The movable parts 1b and 1b' are formed in a substantially semicylindrical shape. The movable parts are respectively pivotally mounted by way of a pair of pins 3 and 3' on a pair of brackets 2 and 2' fastened on the stationary part 1a so as to be in face-to-face relation with the semi-cylindrical elements of the stationary part 1a to form a substantially cylindrical shape therewith. The stationary part 1a and the movable parts 1 b and 1b' serve to hold the upper and lower semi-circular portions of the bead ring 33 × respectively, and the movable parts 1b and 1b' are adapted to be contracted to readily receive another new bead ring after all of the bead rings initially positioned on the drum are withdrawn therefrom. The stationary part 1a and the movable parts 1b and 1b' are so shaped as to form a pair of axially elongated slots opened at the end portions of the stock drum 1, as clearly shown in FIG. 1. The stationary part 1a is mounted on an arm 4 which is in turn mounted on an actuating or control system (not shown), so that the bead ring stock drum 1 is placed at a desired position. The stationary part 1a of the drum 1 has at the both ends thereof a pair of end walls on which a pair of brackets 5 and 5' are respectively fixedly mounted. A pair of fluid pressure operated cylinder assemblies 6 and 6' are pivotally mounted on the brackets 5 and 5' by way of a pair of pins 7 and 7', respectively. The cylinder assemblies 6 and 6' respectively have piston rods 9 and 9' which are in turn pivotally connected by way of pins 10 and 10' on brackets 8 and 8' fixedly mounted on end walls of the movable parts 1b and 1b'. A pair of slide rings 11 and 11' are axially slidably coupled with the bead ring stock drum 1. On the end walls of the stationary part 1a are respectively fixedly mounted two pairs of brackets 12 and 12' on which a pair of stationary rods 13 and 13' are fastened, respectively. A pair of slide members 14 and 14' are slidably mounted on the stationary rods 13 and 13', respectively. The slide members 14 and 14' have both the ends thereof firmly connected to the slide rings 11 and 11', respectively, through the slots defined by the stationary part 1a and movable parts 1b and 1b'. A pair of fluid pressure operated cylinder assemblies 15 and 15' are placed in the hollow of the bead ring stock drum 1. The cylinder assemblies 15 and 15' respectively includes cylinder casings which are respectively mounted on brackets 16 and 16' by way of pins 17 and 17'. The brackets 16 and 16' are fixedly mounted on the stationary part 1a. The cylinder assemblies 15 and 15' respectively include piston rods 18 and 18' which are respectively connected with the slide members 14' and 14 by way of pins 19 and 19'. One or more fluid pressure operated cylinder assemblies 20 are mounted on the end walls of the stationary part 1a and movable parts 1b and 1b'. Each of the cylinder assemblies 20 has a piston rod 21 which is directed radially of the stock drum 1 and is aligned with or inserted into each of gains or bores 22 radially extending through the peripheral wall of both end portions of the bead ring stock drum 1. The piston rods 21 are protruded from the peripheral surface of the bead ring stock drum 1 when the cylinder assemblies 20 are actuated. The slide rings 11 and 11' respectively have gains or bores 23 and 23' which are so arranged as to be in alignment with the gains or bores 22 when the slide rings 11 and 11' are moved to the utmost ends portion of the bead ring stock drum 1. Therefore, the piston rods 21 can protrude from the peripheral surface of the drum 1 even when the slide rings 11 and 11' are moved up to the end portion of the drum 1, so that an actuating system for the cylinder assemblies 20 can be simplified. A reference numeral 24 designates a holding annular member 24 having an inner diameter larger than the outer diameter of the drum. The holding annular member 24 has the inner wall axially outwardly tapered at one end portion thereof and radially inwardly protruded at the other end portion thereof. The holding annular member 24 is mounted on an actuating system (not shown) which can place the holding annular 24 in close proximity to one end of the bead ring stock drum 1 and axial alignment with the drum 1. A bead ring receive sleeve member 27 with an axially extending portion 27a is seated on the protruded portion of the holding annular member 24. The axially extending portion 27a has an outer diameter substantially the same as the outer diameter of the stock drum 1, so that an annular groove is formed by the inner wall of the holding annular member 24 and the outer wall of the portion 27a of the sleeve member 27. A plurality of fluid pressure operated cylinder assemblies 25 are mounted on the peripheral wall of the holding annular member 24. The cylinder assemblies 25 respectively have piston rods 26 which are slidably inserted into a plurality of bores radially extending through the holding annular member 24, respectively.

Figure 4:
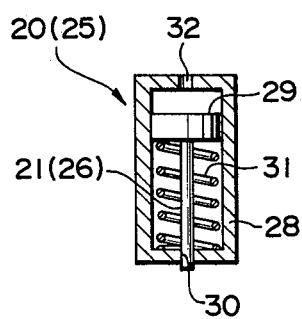
FIG. 4 is a longitudinal sectional view of parts incorporated in the apparatus of FIG. 1.

FIG. 4 illustrates in an enlarged scale one of the fluid pressure operated cylinder assemblies 20 or 25, which includes a cylinder casing 28 with bottomed both ends. A piston 29 is accommodated in the cylinder casing 28. A central opening 30 is formed in one bottomed end wall of the cylinder casing 28, into which the piston rod 21 or 26 is slidably inserted. The piston 29 is urged toward the other end wall in which an inlet port 32 is formed. The piston 29 is moved against the spring 31 by fluid pressure applied thereto through the inlet port 32.

In operation, a plurality of bead rings 33 covered with rubber are mounted on the both end portions of the bead ring stock drum 1, as indicated by phantom lines in FIG. 1. In this instance, the movable parts 1b and 1b' may be moved to a position indicated by phantom lines in FIG. 1 by actuating the cylinder assemblies 6 and 6', and then a number of bead rings 33 are mounted on the bead ring stock drum 1 in such a manner that the upper and lower semi-circular portions of the bead rings 33 are held by the stationary part 1a and the movable parts 1b and 1b', respectively. Thereafter, the bead ring stock drum 1 is moved by the actuation of the actuating system until the drum 1 and the holding annular member 24 are in axial alignment with each other. Then the annular member 24 is moved by the actuation of the actuating system until the side wall of the portion 27a be in close proximity to or contacts with the side wall of the bead ring stock drum 1. Thereafter, the fluid pressure operated cylinder assemblies 15 and 15' are actuated so as to permit the slide rings 11 and 11' respectively push the bead rings toward the ends of the drum 1 until the utmost bead ring 33' couples with the portion 27a of the sleeve member 27 and the adjacent bead ring 33'' comes to the utmost end portion of the drum 1. The bead rings 33 can easily slide on the surface of the bead ring stock drum 1 without the need for any special assisting apparatus since a slight clearance exists between the bead rings 33 and the bead stock drum 1. After the cylinder assemblies 15 and 15' are deenergized, the cylinder assemblies 20 and 25 are energized simultaneously so that the piston rods 21 protrude from the periphery of the drum 1 to hold the bead ring 33'' and the piston rod 26 moves radially inwardly to hold the bead ring 33'. When, thereafter, the holding annular member 24 is moved to depart from the drum 1, the bead rings 33' and 33'' are separated from each other. The cylinder assemblies 20 and 25 are then deenergized. The drum 1 is brought away from the holding annular member 24. The holding annular member 24 is then moved to couple with a rotatable building drum (not shown) so as to apply the bead ring 33' onto the plies on the building drum. Thereafter, the holding annular member 24 is restored to the home position. The above-stated operation of the apparatus may be repeated so as to successively supply the bead rings to the building drum. When all of the bead rings 33 mounted on the drum 1 are sent out from the drum 1, a desired number of bead rings may be again supplied to the drum 1.

It is now to be noted that the cylinder assemblies 20 and 25 may be replaced by solenoid assemblies to be energized by electric power.

It will be appreciated that the bead ring supplying apparatus of the present invention is capable of separate adjacent two bead rings from each other without damage or cut off of the bead rings.

The detailed description of the preferred embodiment of the invention for the purpose of explaining the principles thereof is not to be considered as limiting or restricting the invention, as many modifications may be made by the exercise of skill in the art without departing from the spirit and scope of the invention.

What is claimed is:

1. A bead ring supplying apparatus, comprising in combination:

a collapsible bead ring stock drum of cylindrical shape defined by a semi-cylindrical stationary part and a semi-cylindrical movable part pivotably mounted for radial movement on said semi-cylindrical stationary part, said drum thus being adapted to receive a plurality of bead rings slidably thereon;

means for pivoting said semi-cylindrical movable part inwardly in a generally radial direction so as to readily receive additional bead rings after the initial supply of said bead rings is removed from said bead ring stock drum;

at least one slide ring coupled to said bead ring stock drum for axial movement therealong;

a slide ring actuator connected with said slide ring for sliding said slide ring axially along the periphery of said bead ring stock drum so as to thereby axially slide said bead rings along the surface of and off said bead ring stock drum;

a first holding mechanism including at least one first radially movable member radially movably mounted on said bead ring stock drum and actuating means connected operatively thereto for radially outwardly moving same so as to hold one of said bead rings on said bead ring stock drum;

at least one bead ring receiver sleeve the outer diameter of which is substantially the same as that of said bead ring stock drum positionable adjacent one end of said bead ring stock drum so as to receive bead rings removed therefrom;

an annular holding member movable toward and away from said one end of said bead ring stock drum for axial alignment therewith and the inner diameter of which is larger than the outer diameter of said bead ring receiver sleeve member, said annular holding member carrying thereon said bead ring receiver sleeve in coaxial relation therewith; and a second holding mechanism including a second radially movable member radially movably mounted in the peripheral wall of said annular holding member and actuating means connected to said second radially movable member for radially inwardly moving same so as to hold a bead ring transferred to said bead ring receiver sleeve from said bead ring stock drum.

2. A bead ring supplying apparatus as set forth in claim 1, in which said bead ring stock drum has at least one axially elongated slot, and said slide ring actuator includes a fluid pressure operated assembly positioned within said bead ring stock drum, the cylinder of the cylinder assembly being connected with said bead ring stock drum and the piston rod of the cylinder assembly being connected to said slide ring by means of a connecter passing through said axially elongated slot.

3. A bead ring supplying apparatus as set forth in claim 1, in which said bead ring stock drum has at least one bore radially extending therethrough, and in which said radially movable member is a piston rod slidably inserted into said bore and said actuating means is a fluid operated cylinder incorporated with said piston rod.

4. A bead ring supplying apparatus as set forth in claim 1, in which said annular member has at least one bore radially extending therethrough, and in which said second radially movable member is a piston rod slidably inserted into said bore of the annular member and said actuating means is a fluid operated cylinder incooperated with said piston rod.

5. A bead ring supplying apparatus as set forth in claim 1, in which said means for pivoting said semi-cylindrical movable part is a fluid pressure-operated cylinder mounted on the end wall of said semi-cylindrical stationary part and having a piston rod connected to said semi-cylindrical movable part.

* * * * *